United States Patent
Staffa et al.

(10) Patent No.: US 10,566,757 B2
(45) Date of Patent: Feb. 18, 2020

(54) METHOD OF HEAT SHRINKING A PROTECTIVE SLEEVE ONTO AN ELECTRICAL CONNECTION

(71) Applicant: Lear Corporation, Southfield, MI (US)

(72) Inventors: Adolf Staffa, Želechoivice nad Dřevnicí (CZ); Kamil Churý, Ivanovice na Hané (CZ)

(73) Assignee: Lear Corporation, Southfield, MI (US)

( * ) Notice: Subject to any disclaimer, the term of this patent is extended or adjusted under 35 U.S.C. 154(b) by 95 days.

(21) Appl. No.: 15/374,301

(22) Filed: Dec. 9, 2016

(65) Prior Publication Data

US 2018/0166845 A1 Jun. 14, 2018

(51) Int. Cl.
*H01R 43/20* (2006.01)
*H01R 4/72* (2006.01)
(Continued)

(52) U.S. Cl.
CPC .............. *H01R 43/20* (2013.01); *H01R 4/72* (2013.01); *H01R 4/723* (2013.01); *H01R 4/726* (2013.01);
(Continued)

(58) Field of Classification Search
CPC .............. H01R 43/005; H01R 43/0207; H01R 43/0242; H01R 43/20; H01R 4/723;
(Continued)

(56) References Cited

U.S. PATENT DOCUMENTS 3,819,443 A * 6/1974 Simons .................. H01B 7/282
156/204
4,252,397 A * 2/1981 Eigenbrode ....... Y10T 29/49179
439/405
(Continued)

FOREIGN PATENT DOCUMENTS

JP   H03244527 A   10/1991
JP   H11345522 A   12/1999
(Continued)

OTHER PUBLICATIONS

PCT International Search Report and Written Opinion, Application No. PCT/US2017/044370, dated Oct. 30, 2017.

*Primary Examiner* — A. Dexter Tugbang
(74) *Attorney, Agent, or Firm* — MacMillan, Sobanski & Todd, LLC

(57) ABSTRACT

A method of heat shrinking a protective sleeve onto an electrical connection includes an initial step of providing an electrical connection, such as between an electrical wire and an electrical termination device, and a protective sleeve having an inner surface and an outer surface. The inner surface of the protective sleeve has an adhesive material applied thereto and is disposed about the electrical connection. Thermal energy is applied to the outer surface of the protective sleeve so as to increase the temperature thereof. Either before, at the same time, or after this step, the temperature of some or all of the electrical connection disposed within the protective sleeve is increased, such as by induction heating. As a result, the protective sleeve shrinks (Continued)

onto the electrical connection, and the adhesive material forms a tight bond between the protective sleeve and the electrical connection.

18 Claims, 4 Drawing Sheets

(51) Int. Cl.
*H01R 43/00* (2006.01)
*H01R 43/02* (2006.01)
*H01B 7/282* (2006.01)

(52) U.S. Cl.
CPC ....... *H01R 43/005* (2013.01); *H01R 43/0207* (2013.01); *H01R 43/0242* (2013.01); *H01R 43/0263* (2013.01); *H01B 7/282* (2013.01); *Y10T 29/49179* (2015.01); *Y10T 29/49208* (2015.01)

(58) Field of Classification Search
CPC ...... H01R 4/726; H01R 43/0263; H01R 4/72; Y10T 29/49179; Y10T 29/49208; H01B 7/282
See application file for complete search history.

(56) References Cited

U.S. PATENT DOCUMENTS

| | | | |
|---|---|---|---|
| 5,064,978 A | | 11/1991 | Scholz |
| 6,142,825 A | * | 11/2000 | Shinchi ................ H01R 43/005 |
| | | | 439/587 |
| 6,369,474 B1 | * | 4/2002 | Tanaka .............. Y10T 29/49179 |
| | | | 29/860 |
| 2005/0194377 A1 | | 9/2005 | Kirby |
| 2007/0269169 A1 | | 11/2007 | Stix et al. |
| 2014/0060882 A1 | * | 3/2014 | Ellis ........................ H01R 43/28 |
| | | | 174/78 |
| 2014/0326708 A1 | | 11/2014 | Barfuss et al. |
| 2015/0357810 A1 | | 12/2015 | Yamasaki et al. |

FOREIGN PATENT DOCUMENTS

| | | | |
|---|---|---|---|
| JP | 2004218099 A | | 8/2004 |
| JP | 2006054173 A | | 2/2006 |
| JP | 2008204644 A | * | 9/2008 |
| JP | 5771254 B2 | | 8/2015 |
| WO | 96/31090 A1 | | 10/1996 |
| WO | 97/23924 A1 | | 7/1997 |
| WO | 98/21796 A1 | | 5/1998 |
| WO | 98/21800 A1 | | 5/1998 |

* cited by examiner

METHOD OF HEAT SHRINKING A PROTECTIVE SLEEVE ONTO AN ELECTRICAL CONNECTION

BACKGROUND OF THE INVENTION

This invention relates in general to methods of manufacturing water resistant electrical connections. In particular, this invention relates to an improved method of heat shrinking a protective sleeve onto an electrical connection to provide a water resistant covering therefor.

In many automotive and other applications, electrical wires are used to connect electrical devices with one another. Often, the ends of such electrical wires are connected to electrical termination devices, such as eyelets, terminals, and the like, that facilitate the connection of the electrical wire to the electrical device. An electrical connection may be made between an electrical wire and an electrical termination device in a variety of ways, such as by soldering or crimping, for example. In some instances, a conductor portion of the electrical wire may be formed from a first material (such as aluminum), and the electrical termination device may be formed from a second material (such as copper) that is different from the first material. When the electrical wire and the electrical termination device are formed from different materials, a water resistant covering may be provided over the electrical connection because water can cause corrosion to occur at the junction of the different materials used to form the electrical connection.

It is known to provide such a water resistant covering in the form of a hollow protective sleeve that, when subjected to heat, shrinks onto the electrical connection between the electrical wire and the electrical termination device. Typically, the protective sleeve is a plastic tube having an inner surface that is coated with an adhesive. The protective sleeve is initially positioned about the electrical connection, then is subjected to heat. Such heat causes the protective sleeve to shrink until the adhesive on the inner surface of the sleeve engages the electrical connection. The heat also causes the adhesive to seal the protective sleeve to the electrical connection. Thus, the protective sleeve provides a water resistant covering for the electrical connection.

In the past, an external radiant heat source has been disposed about the protective sleeve in order to generate the heat necessary to shrink the protective sleeve onto the electrical connection as described above. Although the use of an external radiant heat source has been effective, it is known that the heat from such an external radiant heat source must pass through the protective sleeve in order to reach the adhesive provided on the inner surface thereof. This is undesirable for several reasons. Thus, it would be desirable to provide an improved method of heat shrinking a protective sleeve onto an electrical connection that avoids this issue.

SUMMARY OF THE INVENTION

This invention relates to an improved method of heat shrinking a protective sleeve onto an electrical connection to provide a water resistant covering therefor. In an initial step of the method, an electrical connection, such as a connection between an electrical wire and an electrical termination device, and a protective sleeve having an inner surface and an outer surface are provided. The inner surface of the protective sleeve has an adhesive material applied thereto and is disposed about the electrical connection. Thermal energy is applied to the outer surface of the protective sleeve so as to increase the temperature thereof. Either before, at the same time, or after this application of thermal energy to the outer surface of the protective sleeve, the temperature of some or all of the electrical connection disposed within the protective sleeve is increased, such as by induction heating. As a result, the protective sleeve shrinks onto the electrical connection, and the adhesive material forms a tight bond between the protective sleeve and the electrical connection.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
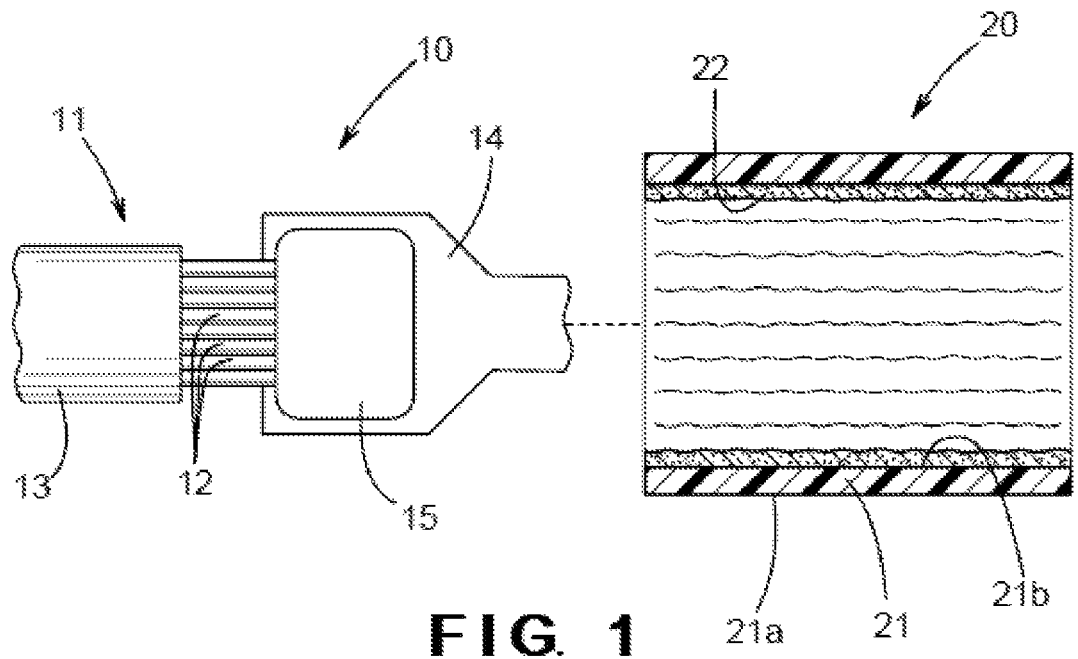
FIG. 1 is a side elevational view, partially in cross section, of a first step in a method of heat shrinking a protective sleeve onto an electrical connection in accordance with this invention.

Referring now to the drawings, there is illustrated a method of protectively covering an electrical connection, indicated generally at 10, by means of heat shrinking a protective sleeve, indicated generally at 20, thereon in accordance with this invention. Although this invention will be described in the context of heat shrinking the illustrated protective sleeve 20 onto the illustrated electrical connection 10, it will be appreciated that the scope of this invention is not intended to be so limited. On the contrary, as will become apparent below, this invention may be used in any desired environment for the purposes described below.

The electrical connection 10 is, of itself, conventional in the art and is intended to be representative of any structure that is desired to be protectively covered by the protective sleeve 20. In the illustrated embodiment, the electrical connection 10 includes an electrical conductor, indicated generally at 11, that includes an inner plurality of electrically conductive wires 12 and an outer insulator portion 13. If desired, the plurality of electrically conductive wires 12 may alternatively be embodied as a single electrically conductive wire. In either event, an end of the outer insulator portion 13 is shown removed to expose the plurality of electrically conductive wires 12, although such is not required. The exposed portion of the plurality of electrically conductive wires 12 is electrically connected to an electrical termination device 14. The electrical termination device 14 is conventional in the art and may be embodied as any desired structure or combination of structures including, for example, eyelets, terminals, and the like.

A securing structure 15 is provided to connect the plurality of electrically conductive wires 12 to the electrical termination device 14. In the illustrated embodiment, the securing structure 15 is a conventional solder joint that both mechanically and electrically connects the plurality of electrically conductive wires 12 to the electrical termination device 14. However, the plurality of electrically conductive wires 12 may be connected to the electrical termination device 14 by any other desired securing structure 15, such as by crimping a portion of the electrical termination device 14 onto some or all of the plurality of electrically conductive wires 12, for example. If desired, the electrical connection 10 may alternatively be embodied as a single unitary structure, such as electrical conductor 11 or an electrical termination device 14, for example, and the term "electrical connection" is intended to cover any such structure or combination of structures.

The illustrated protective sleeve 20 includes a body 21 that is generally hollow and cylindrical in shape. However, the body 21 of the protective sleeve 20 may have any desired shape. The body 21 of the protective sleeve 20 is formed from a heat shrinkable material, i.e., a material that becomes physically smaller in size in response to the application of heat thereto. Non-limiting examples of heat shrinkable materials include polyolefin, fluoropolymer, polyvinyl chloride, neoprene, silicone elastomer, and the like.

The body 21 of the protective sleeve 20 includes an outer surface 21a and an inner surface 21b. The inner surface 21b of the body 21 is coated with an adhesive material 22. The adhesive material 22 may coat the entire inner surface 21b of the body 21 or only one or more discrete portions thereof, as desired. The adhesive material 22 is preferably formed from a thermosetting composition (i.e., a composition that is cured or otherwise activated from a relatively soft state to a relatively hard state by the application of heat), although such is not required. Non-limiting examples of thermosetting adhesive materials include epoxy, polyurethane, cyanoacrylate, acrylic polymers, and the like.

FIG. 1 illustrates a first step in a method of heat shrinking the protective sleeve 20 onto the electrical connection 10 in accordance with this invention. As shown therein, the protective sleeve 20 is initially aligned co-axially with the electrical connection 10. In its initial non-shrunk state, the inner surface 21b of the protective sleeve 20 (including the adhesive material 22) is preferably larger in dimension than any outer surface portion of the electrical connection 10, although such is not required.

Figure 2:
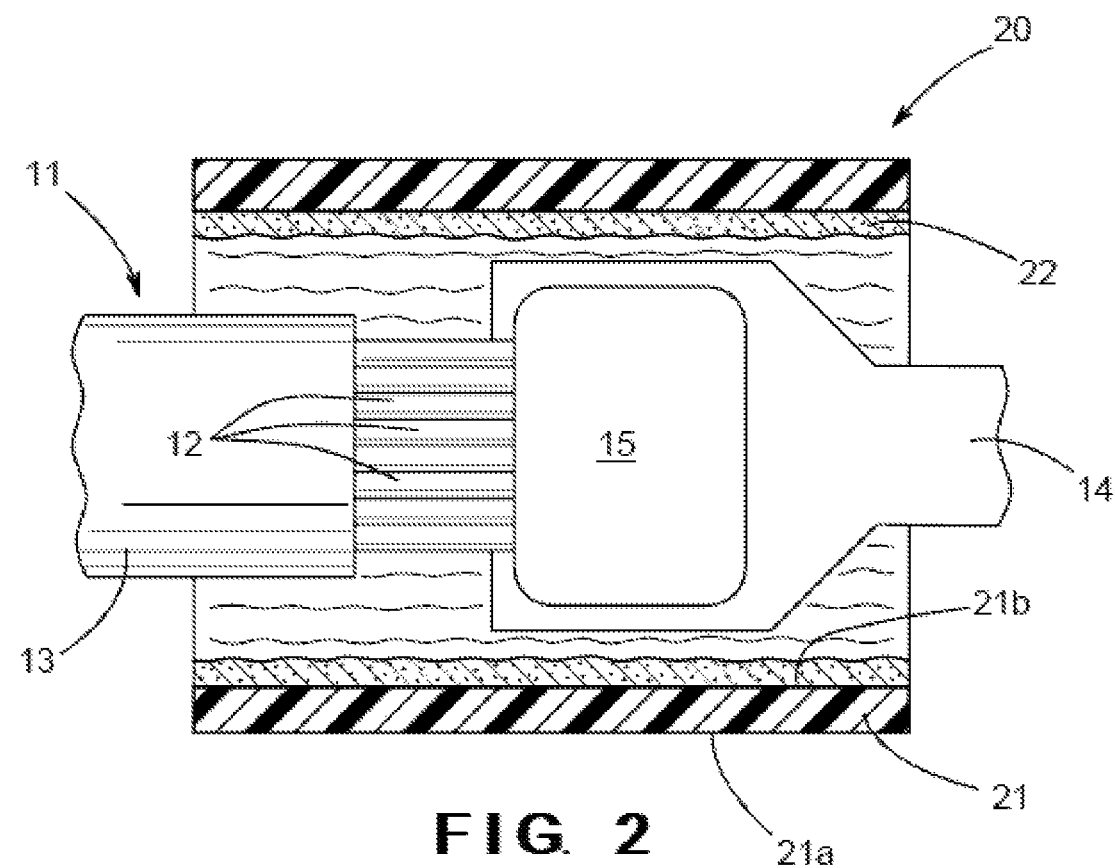
FIG. 2 is a side elevational view, partially in cross section, of a second step in the method of this invention.

FIG. 2 illustrates a second step in a method of heat shrinking the protective sleeve 20 onto the electrical connection 10 in accordance with this invention. As shown therein, the protective sleeve 20 is next moved co-axially about the electrical connection 10. A first end portion of the protective sleeve 20 (the left end when viewing FIG. 2) is preferably disposed about a portion of the outer insulator portion 13 of the electrical conductor 11, while a second end portion of the protective sleeve 20 (the right end when viewing FIG. 2) is preferably disposed about a portion of the electrical termination device 14, although neither is required. Thus, the electrical connection 10 (including the securing structure 15) between the plurality of electrically conductive wires 12 and the electrical termination device 14 is completely surrounded by the protective sleeve 20.

Figure 3:
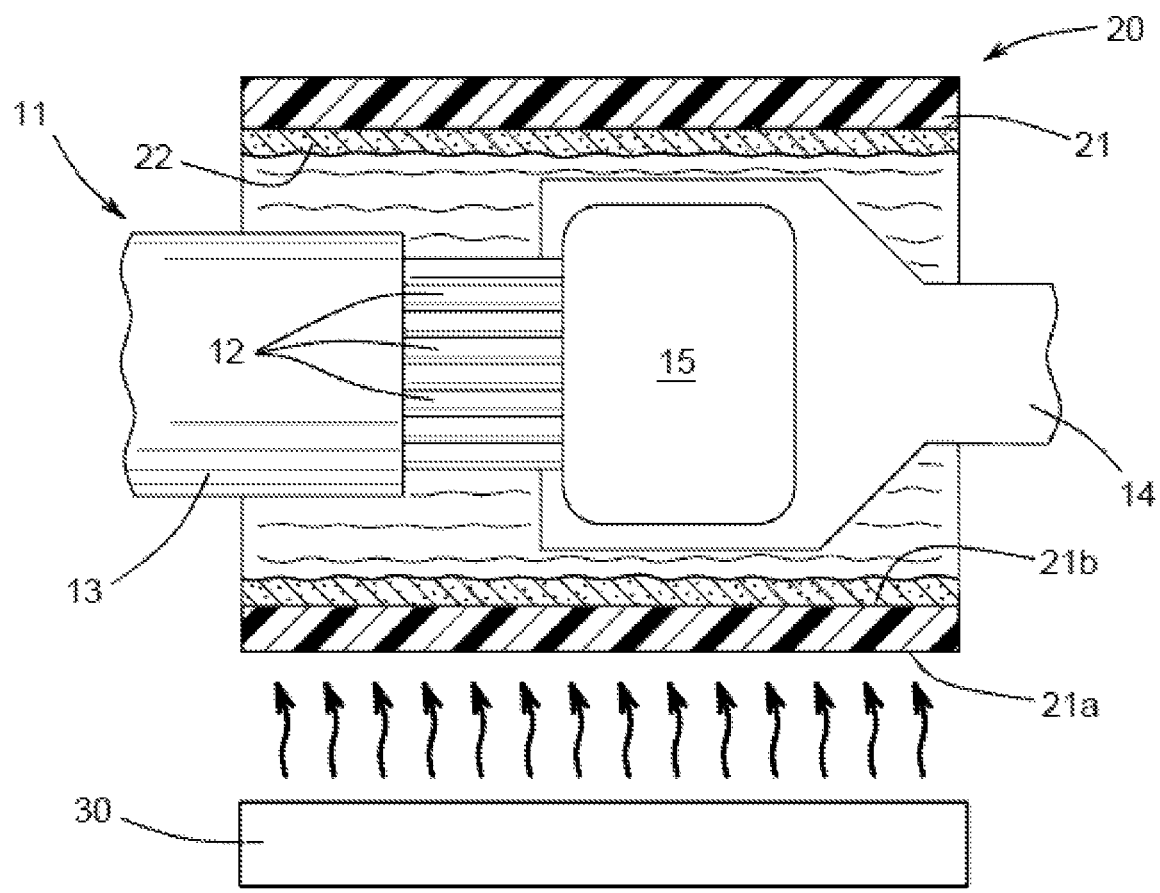
FIG. 3 is a side elevational view, partially in cross section, of a third step in the method of this invention.

FIG. 3 illustrates a third step in a method of heat shrinking the protective sleeve 20 onto the electrical connection 10 in accordance with this invention. As shown therein, a first heat source 30 is disposed adjacent to the outer surface 21a of the body 21 of the protective sleeve 20. The first heat source 30 may be embodied as any known device that can radiate or otherwise apply thermal energy to the outer surface 21a of the body 21 of the protective sleeve 20 so as to increase the temperature thereof in a known manner. The amount of such heat applied to the outer surface 21a of the body 21 of the protective sleeve 20 can be determined in accordance with a number of factors including, for example, the materials used to form the protective sleeve 20 and the adhesive material 22. The first heat source 30 may radiate or otherwise apply thermal energy to only some or to all of the outer surface 21a of the body 21 of the protective sleeve 20.

Figure 4:
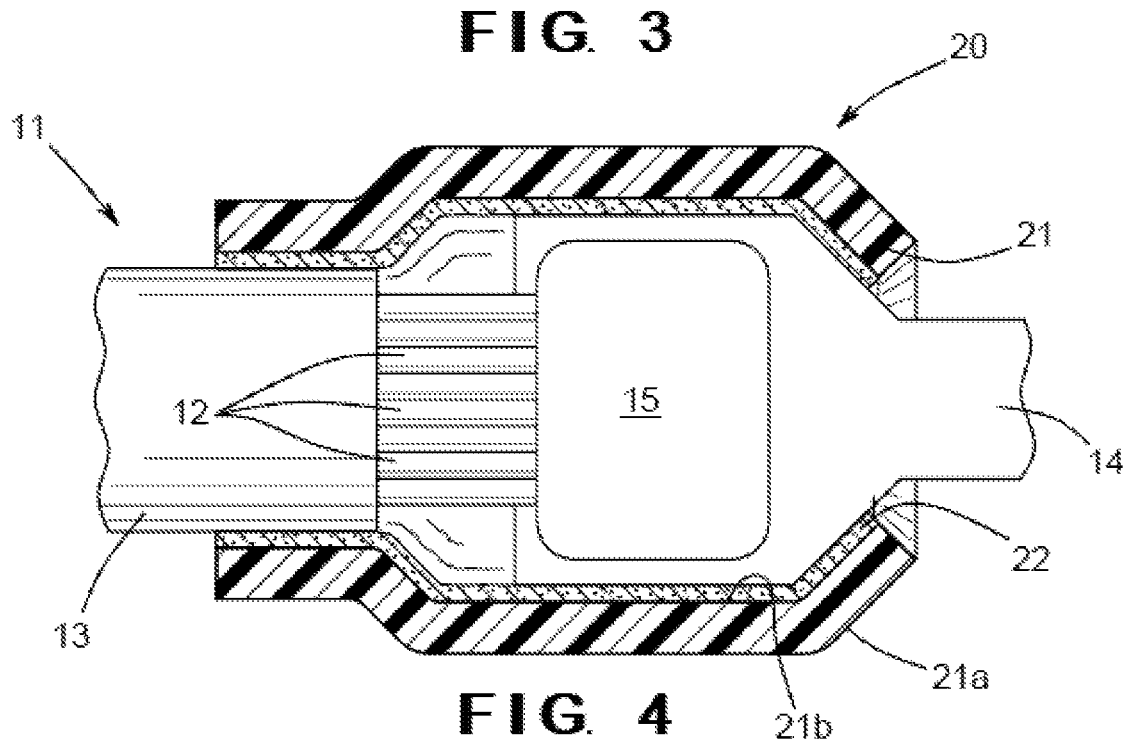
FIG. 4 is a side elevational view, partially in cross section, of a fourth step in the method of this invention.

FIG. 4 illustrates a fourth step in a method of heat shrinking the protective sleeve 20 onto the electrical connection 10 in accordance with this invention. As shown therein, the first heat source 30 has been actuated to apply heat to the outer surface 21a of the body 21 of the protective sleeve 20. As mentioned above, the body 21 of the protective sleeve 20 is formed from a heat shrinkable material, i.e., a material that becomes physically smaller in size in response to the application of heat thereto. Thus, the protective sleeve 20 shrinks onto the electrical connection 10 in response to the application of heat thereto by the first heat source 30. As shown in FIG. 4, the shrinking of the protective sleeve causes the adhesive material 22 provided on the inner surface 21b of the body 21 to engage some or all of the electrical connection 10 including, in the illustrated embodiment, the outer insulator portion 13, the plurality of electrically conductive wires 12, and the electrical termination device 14.

Figure 5:
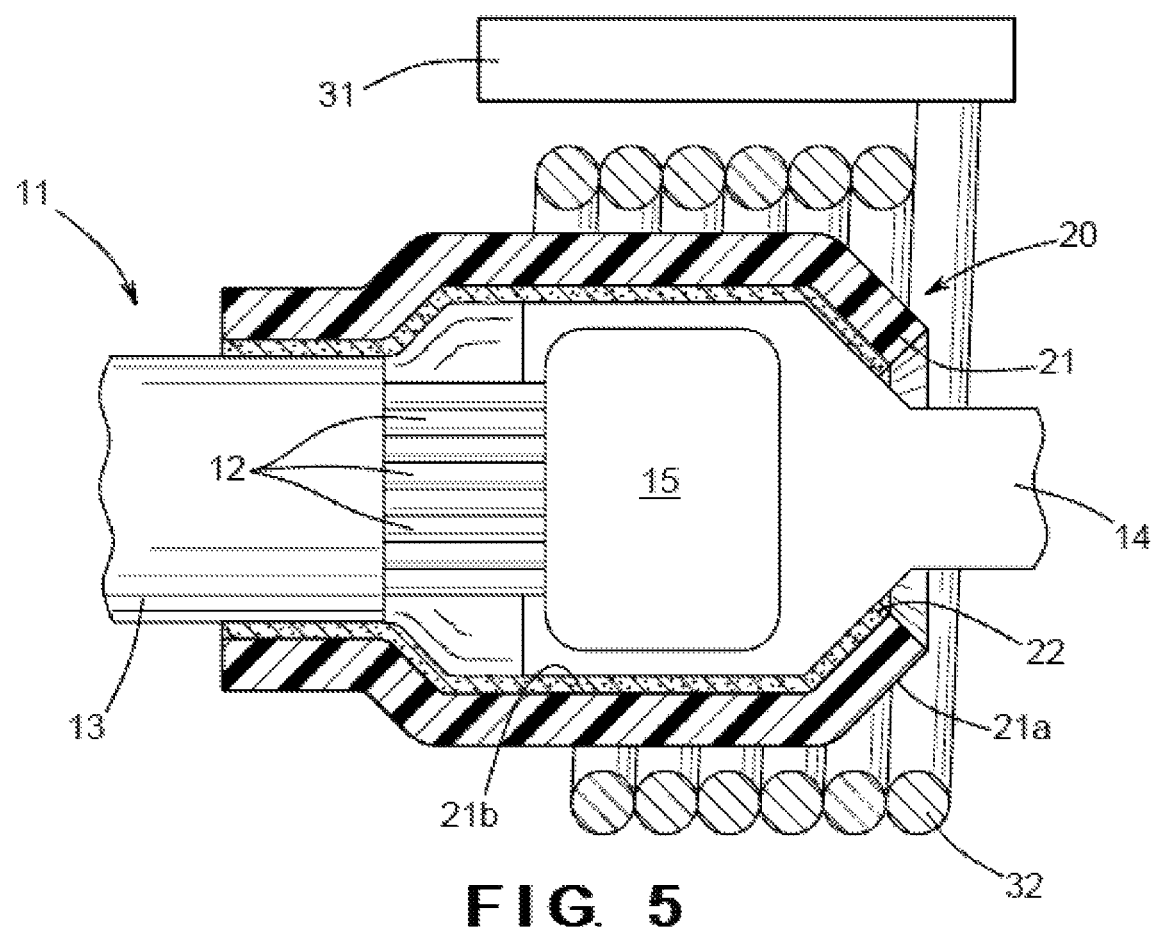
FIG. 5 is a side elevational view, partially in cross section, of a fifth step in the method of this invention.

FIG. 5 illustrates a fifth step in a method of heat shrinking the protective sleeve 20 onto the electrical connection 10 in accordance with this invention. As shown therein, a second heat source 31 is provided that increases the temperature of some or all of the electrical connection 10 disposed within the body 21 of the protective sleeve 20. In the illustrated embodiment, the second heat source 31 is an induction heating apparatus that includes an induction coil 32 that is disposed about a portion of the outer surface 21a of the body 21 of the protective sleeve 20. As is well known in the art, induction heating is a conventional process of heating an electrically conducting object (such as the electrical connection 10 disposed within the body 21 of the protective sleeve 20) by means of electromagnetic induction. This may, for example, be accomplished by causing a high-frequency alternating current to flow through the induction coil 32, which creates a rapidly alternating magnetic field that penetrates the electrically conducting object (i.e., the electrical connection 10). This, in turn, causes electrical currents (often called eddy currents) to flow inside the electrical connection 10. The flow of such eddy currents is resisted by the material used to form the electrical connection 10, which increases the temperature of such material.

Figure 6:
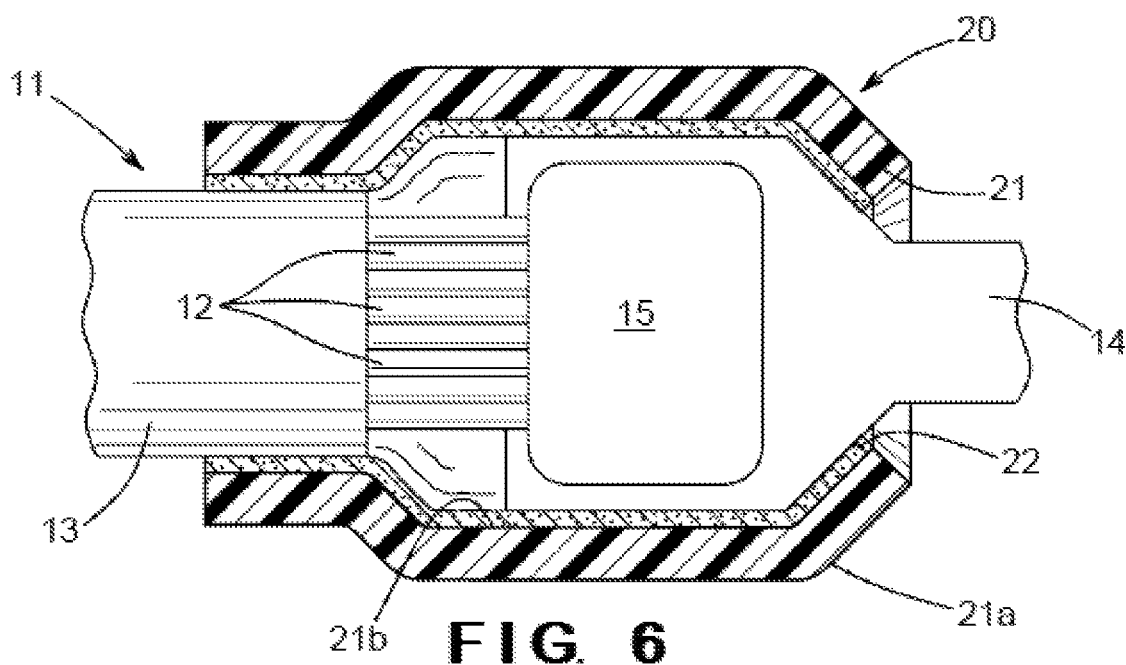
FIG. 6 is a side elevational view, partially in cross section, of a sixth step in the method of this invention.

FIG. 6 illustrates a sixth step in a method of heat shrinking the protective sleeve 20 onto the electrical connection 10 in accordance with this invention. As mentioned above, the adhesive material 22 is preferably formed from a thermosetting composition, i.e., a composition that cured or otherwise activated from a relatively soft state to a relatively hard state by the application of heat. Consequently, when the electrical connection 10 has been heated by the second heat source 31, the adhesive material 22 is cured or otherwise activated from a relatively soft state to a relatively hard state, forming a tight bond between the protective sleeve 20 and the electrical connection 10. As a result, the undesirable aspects mentioned above of using an external radiant heat source to heat the adhesive material 22 provided on the inner surface 21b of the protective sleeve 20 are avoided.

An important advantage of the induction heating process is that the heat is generated within the electrical connection 10 itself, instead of being radiated or otherwise transmitted thereto by heat conduction from the exterior. As a result, there need not be any physical contact with the electrical connection 10, which is disposed within the body 21 of the protective sleeve 20 and, thus, not readily accessible. Additionally, the induction heating process allows the electrical connection 10 to be heated very rapidly. For this reason, it is also preferable that, as shown in FIG. 5, the induction coil 32 is not disposed about any portion of the outer insulator portion 13 of the electrical conductor 11. This is done to insure that the outer insulator portion 13 of the electrical conductor 11 is not melted or otherwise damaged during the induction heating process. However, the induction coil 32 may be disposed about any portion of the electrical connection 10.

Figure 7:
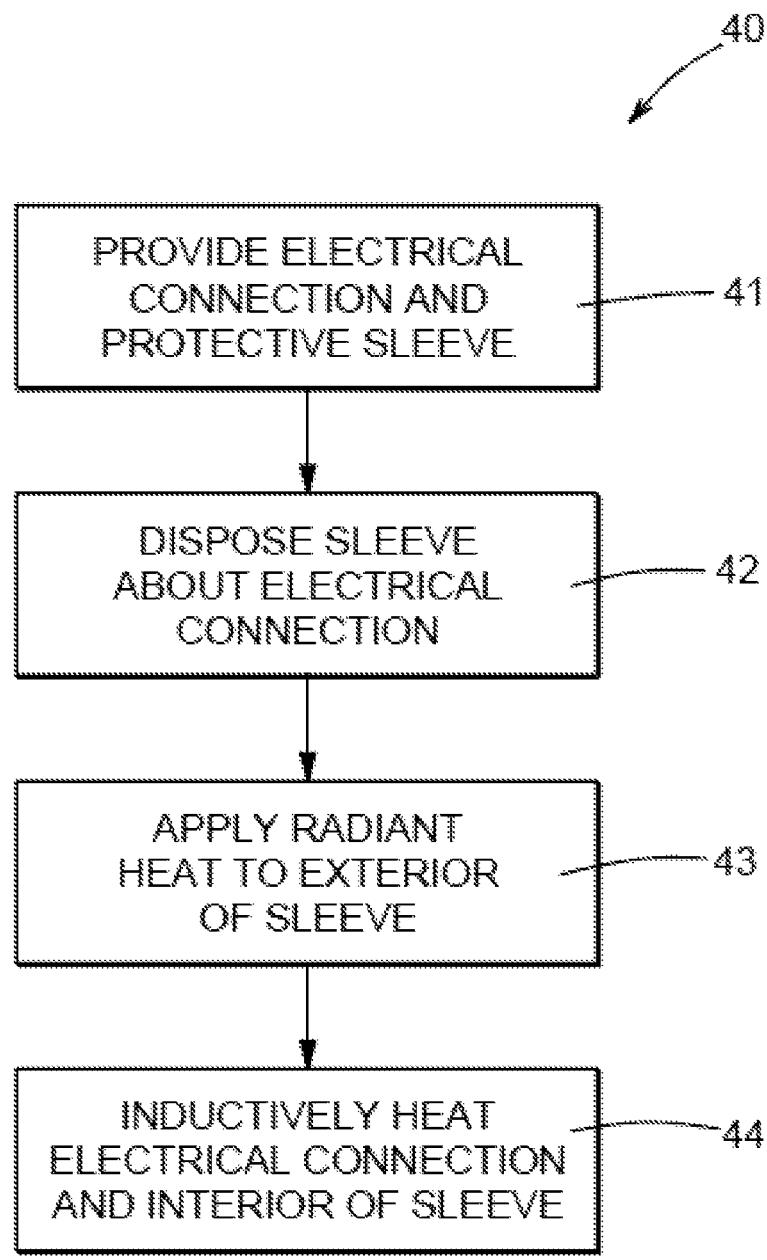
FIG. 7 is a flow chart of the method of heat shrinking a protective sleeve onto an electrical connection in accordance with this invention.

FIG. 7 is a flow chart of a method, indicated generally at 40, of heat shrinking a protective sleeve onto an electrical connection in accordance with this invention. In a first step 41 of this method 40, the electrical connection 10 and the protective sleeve 20 are provided, as shown in FIG. 1 and as described above. In a second step 42 of this method 40, the protective sleeve 20 is disposed about the electrical connection 10, as shown in FIG. 2 and as described above. In a third step 43 of this method 40, the first heat source 30 is actuated to radiate or otherwise apply thermal energy to the outer surface 21a of the body 21 of the protective sleeve 20 so as to increase the temperature thereof, as shown in FIG. 3 and as described above. Lastly, in a fourth step 44 of this method 40, the second heat source 31 is actuated to increase the temperature of some or all of the electrical connection 10 disposed within the body 21 of the protective sleeve 20, as shown in FIG. 5 and as described above.

Importantly, it should be noted that the third step 43 (wherein the first heat source 30 is actuated to radiate or otherwise apply thermal energy to the outer surface 21a of the body 21 of the protective sleeve 20) and the fourth step 44 (wherein the second heat source 31 is actuated to increase the temperature of some or all of the electrical connection 10 disposed within the body 21 of the protective sleeve 20) do not need to be performed in the illustrated and described sequential order. On the contrary, the third step 43 and the fourth step 44 of this method 40 may be performed in reverse order (i.e., the fourth step 44 before the third step 43) if desired. Alternatively, the third step 43 and the fourth step 44 may be performed simultaneously if desired.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method comprising the steps of:
   (a) providing an electrical connection and a protective sleeve formed from a heat shrinkable material having an inner surface and an outer surface;
   (b) disposing the inner surface of the protective sleeve about the electrical connection to define an axially overlapped region;
   (c) actuating a first heat source to apply thermal energy to the outer surface of the protective sleeve in the axially overlapped region so as to increase the temperature of the protective sleeve; and
   (d) actuating a second heat source to increase the temperature of some or all of the electrical connection disposed within the protective sleeve in the axially overlapped region,
   wherein the steps of actuating the first heat source to apply thermal energy to the outer surface of the protective sleeve so as to increase the temperature of the protective sleeve in the axially overlapped region and of actuating the second heat source to increase the temperature of some or all of the electrical connection disposed within the protective sleeve in the axially overlapped region shrinks the protective sleeve such that the inner surface of the protective sleeve engages the electrical connection.

2. The method defined in claim 1 wherein the step of providing the electrical connection is performed by providing the electrical connection that includes an electrical conductor that is electrically connected to an electrical termination device.

3. The method defined in claim 1 wherein the step of providing the protective sleeve is performed by providing the protective sleeve having an inner surface that is coated with an adhesive material.

4. The method defined in claim 3 wherein the adhesive material is a thermosetting composition.

5. The method defined in claim 1 wherein the step of actuating the first heat source to apply thermal energy to the outer surface of the protective sleeve is performed by disposing the first heat source adjacent to the outer surface of the protective sleeve.

6. The method defined in claim 1 wherein the step of actuating the second heat source to increase the temperature of some or all of the electrical connection is performed by inductively heating the electrical connection.

7. The method defined in claim 1 wherein the step of actuating the first heat source to apply thermal energy to the outer surface of the protective sleeve is performed before the step of actuating the second heat source to increase the temperature of some or all of the electrical connection.

8. The method defined in claim 1 wherein the step of actuating the first heat source to apply thermal energy to the outer surface of the protective sleeve is performed after the step of actuating the second heat source to increase the temperature of some or all of the electrical connection.

9. The method defined in claim 1 wherein the step of actuating the first heat source to apply thermal energy to the outer surface of the protective sleeve is performed simultaneously with the step of actuating the second heat source to increase the temperature of some or all of the electrical connection.

10. The method defined in claim 1 wherein the step of providing the protective sleeve is performed by providing the protective sleeve that is hollow in shape.

11. The method defined in claim 1 wherein the step of providing the protective sleeve is performed by providing the protective sleeve that is generally hollow and cylindrical in shape.

12. A method comprising the steps of:
    (a) providing an electrical connection and a hollow protective sleeve formed from a heat shrinkable material having an inner surface and an outer surface;
    (b) disposing the inner surface of the hollow protective sleeve about the electrical connection to define an axially overlapped region;
    (c) actuating a first heat source to apply thermal energy to the outer surface of the hollow protective sleeve in the axially overlapped region so as to increase the temperature of the hollow protective sleeve; and (d) actuating a second heat source to increase the temperature of some or all of the electrical connection disposed within the hollow protective sleeve in the axially overlapped region, wherein the steps of actuating the first heat source to apply thermal energy to the outer surface of the hollow protective sleeve so as to increase the temperature of the hollow protective sleeve in the axially overlapped region and of actuating the second heat source to increase the temperature of some or all of the electrical connection disposed within the hollow protective sleeve in the axially overlapped region shrinks the hollow protective sleeve onto the electrical connection.

13. The method defined in claim 12 wherein the step of providing the protective sleeve is performed by providing the protective sleeve having an inner surface that is coated with an adhesive material.

14. The method defined in claim 12 wherein the step of actuating the first heat source to apply thermal energy to the outer surface of the protective sleeve is performed by disposing the first heat source adjacent to the outer surface of the protective sleeve.

15. The method defined in claim 12 wherein the step of actuating the second heat source to increase the temperature of some or all of the electrical connection is performed by inductively heating the electrical connection.

16. The method defined in claim 12 wherein the step of actuating the first heat source to apply thermal energy to the outer surface of the protective sleeve is performed before the step of actuating the second heat source to increase the temperature of some or all of the electrical connection.

17. The method defined in claim 12 wherein the step of actuating the first heat source to apply thermal energy to the outer surface of the protective sleeve is performed after the step of actuating the second heat source to increase the temperature of some or all of the electrical connection.

18. The method defined in claim 12 wherein the step of actuating the first heat source to apply thermal energy to the outer surface of the protective sleeve is performed simultaneously with the step of actuating the second heat source to increase the temperature of some or all of the electrical connection.

* * * * *